United States Patent [19]

Collins

[11] Patent Number: 4,521,182
[45] Date of Patent: Jun. 4, 1985

[54] METHOD AND APPARATUS FOR HEATING PARTICULATE MATERIAL

[75] Inventor: Albert R. Collins, Ontario, Calif.

[73] Assignee: Grefco, Inc., Bala Cynwyd, Pa.

[21] Appl. No.: 341,490

[22] Filed: Jan. 21, 1982

[51] Int. Cl.³ .................. F27B 14/00; F27B 15/00; C04B 31/22

[52] U.S. Cl. ................ 432/13; 252/378 P; 432/58

[58] Field of Search ............ 432/13, 58; 252/378, 252/378 P

[56] References Cited

U.S. PATENT DOCUMENTS

| | | | |
|---|---|---|---|
| 2,521,190 | 9/1950 | Stafford et al. | 432/58 |
| 2,550,877 | 5/1951 | Stafford et al. | 252/378 P |
| 2,572,484 | 10/1951 | Howle et al. | 432/58 X |
| 2,602,782 | 7/1952 | Zoradi | 432/13 |
| 2,625,512 | 1/1953 | Powell | 252/378 P |
| 2,639,132 | 5/1953 | Bradford | 432/58 |
| 2,932,498 | 4/1960 | Metcalfe et al. | 432/58 |
| 3,010,911 | 11/1961 | Robinson | 432/13 |
| 3,118,658 | 1/1964 | Dennert | 432/58 |
| 3,627,285 | 12/1981 | Slemssen | 432/110 |

*Primary Examiner*—John J. Camby
*Attorney, Agent, or Firm*—Finnegan, Henderson, Farabow, Garrett & Dunner

[57] ABSTRACT

Particulate material is heated by directing a flame downwardly along the central axis of a vertically disposed furnace. The particulate material is introduced at a number of locations distributed radially around the flame at the upper end of the furnace. The particulate material is directed downwardly and toward the central axis of the furnace placing the particulate material within the flame as it passes downwardly through the furnace.

21 Claims, 4 Drawing Figures

METHOD AND APPARATUS FOR HEATING PARTICULATE MATERIAL

BACKGROUND OF THE INVENTION

The present invention relates to means for heating particulate material and especially minerals that expand upon heating. The invention finds particular utility in expanding particulate perlite.

Perlite is a siliceous material of volcanic origin having a silicon content of about 65 percent by weight, a combined water content of from 2 to 5 percent by weight and additional amounts of aluminium, sodium, and potassium. Perlite is mined in a strip mining operation where the over burden is removed and the perlite ore collected. The ore is crushed and then heated to a temperature in the range from 870° to 1150° C. When the material is heated in that range the mineral is softened and suddenly expands to form a light-weight cellular particle when the water within the particle expands. The expanded cellular particle is relatively strong, inert, and resistant to relatively high temperatures. As a result, it finds application in a number of industrial products including filter aids, thermal insulation, inert fillers for such materials as plaster and concrete, and other applications requiring a light-weight inert particulate material. In most of these applications the expanded perlite is utilized in large quantities as a bulk product. Because of the relatively large amount of energy associated with the expansion process there has been a long standing effort to develop efficient and practicle means of carrying out the expansion.

In addition to the expansion of perlite, there are number of industrial processes that require the heating of particulate materials to high temperatures. For example, there are other mineral products that can be expanded by drying or the application of heat such as vermiculite, some types of clay, shale, obsidian. Even organic materials such as cereal grain may be expanded by a high temperature treatment, albeit at a different temperature range than mineral products.

THE PRIOR ART

There are a number of methods and apparatus utilized to expand particulate material and especially perlite ore. Typical of the conventional process of expanding perlite ore is that disclosed in U.S. Pat. No. 2,639,132. Particulate perlite ore is introduced to the bottom of a columnar furnace with large amounts of heated air and a flame with the expansion process being carried out as the perlite is conducted upward through the furnace. The expansion of perlite can also be carried out in a rotary kiln as depicted in U.S. Pat. No. 2,602,782.

Each of these methods are useful in the expansion of particulate perlite, however, the rotary kiln technique is characterized by high energy costs and only moderate efficiency. The expansion of perlite in a vertical furnace where the particles are carried upward with the flame and heated air has the disadvantages of being thermally inefficient and produces uneven expansion of the particles.

In addition to these methods there are means of introducing the material to be expanded at the upper end of a columnar furnace. U.S. Pat. No. 3,627,285 discloses an apparatus where the material to be expanded falls downward through the central portion of a vertically extended furnace with a number of burners on the side walls directing hot gases toward this material. U.S. Pat. Nos. 2,550,877, 2,625,512, and 2,521,190 all disclose apparatus for expanding perlite where the material to be expanded is introduced to the upper end of a columnar furnace with having a burner directing a flame downwardly along the centerline of the furnace. The introduction of the material to be expanded at the upper end of a vertical oriented furnace and directing the flame downward through the furnace are both aspects of the invention disclosed herein. As will be evident from the description of the invention, significant differences between these prior devices and the present invention render the present invention more effective than the prior art devices.

The primary object of the present invention is to provide a means for efficiently heating large quantities of particulate material.

An additional object of the present invention is to provide a method for expanding particulate perlite that is significantly more thermally efficient than conventional methods.

Still another object of the present invention is to provide a method for expanding particulate perlite at significantly higher rates than conventional methods while utilizing less energy per ton of perlite being expanded.

Additional objects and advantages of the invention will be set forth in part in the description which follows, and in part will be obvious from the description or may be learned by practice of the invention. The objects and advantages of the invention may be realized and attained by means of the instrumentalities particularly pointed out in the appended claims.

SUMMARY OF THE INVENTION

To achieve the foregoing objects and in accordance with the purpose of the invention as embodied and broadly described herein the apparatus of this invention comprises a means for heating particulate solids. The apparatus includes a vertically oriented cylindrical furnace having upper and lower portions. A burner located on the upper portion of the furnace is disposed to direct a flame downwardly along the centerline of the furnace. Means in the upper portion of the furnace introduce the particulate solids into the furnace at a plurality of locations. The means for introducing the particulate solids include a plurality of distribution heads surrounding the burner. Each of the distribution heads includes a conduit portion disposed to direct a stream of the particulate solids both downwardly and toward the centerline of the furnace thereby putting the particulate solids into the flame. Preferably, the conduit portion of the means for introducing the particulate solids includes an input conduit and a directing conduit that are in flow communication. The directing conduit is preferably disposed in an angle from 30 to 45 degrees from the vertical.

The method for expanding particulate perlite ore comprises the steps of directing a flame downwardly along the central axis of a vertical disposed cylindrical furnace. The perlite ore is introduced into the furnace at a plurality of locations distributed radially around the flame at the upper end of the furnace. The perlite ore is directed downwardly and toward the central axis of the furnace thereby placing the perlite ore within the flame as the perlite ore passes downwardly through the furnace. Preferably the perlite ore is introduced to the furnace at more than four locations on the upper end of the furnace. It is also preferred that the perlite ore be introduced to the furnace at an angle from the vertical and the range is from 30 to 45 degrees.

A preferred embodiment of the present invention is depicted in the accompanying drawings.

THE DRAWINGS

The accompanying drawings which are incorporated in and constitute a part of the specification, illustrate one embodiment of the invention and together with the description serve to explain the principles of the invention.

THE DESCRIPTION OF THE PREFERRED EMBODIMENT

Reference will now be made in detail to the present preferred embodiment of the invention, an example of which is illustrated in the accompanied drawings.

Figure 1:
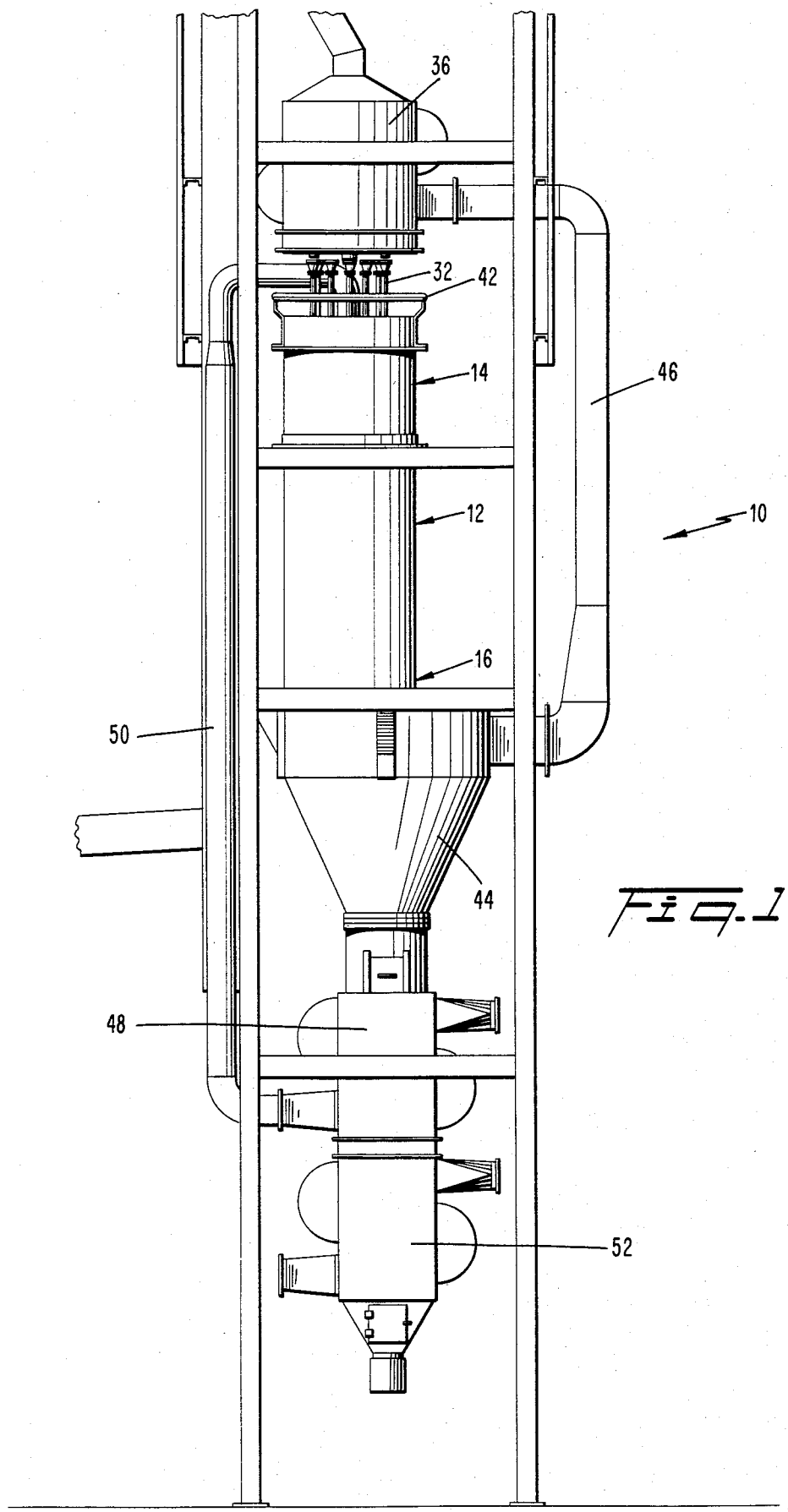
FIG. 1 is an overall view of the apparatus of the present invention showing the vertically oriented furnace in combination with other equipment interfacing with the furnace.

Referring now to FIG. 1 it may be seen that the apparatus for heating particulate solids, generally depicted as 10, is comprised of a vertically oriented cylindrical furnace 12 having an upper portion 14 and a lower portion 16. As here embodied and most clearly depicted in FIG. 2, the furnace is comprised of an inner shell 18, an outer shell 20 having thermal insulation 22 therebetween. It is preferred that the thermal insulation be capable of withstanding the temperature associated with the operation of the device and blanket fiber insulation has proved to be useful for this purpose. It is also preferred that the inner shell of the furnace be constructed of stainless steel which withstands the temperature involved and provides the appropriate mechanical properties for the construction of the device. The embodiment depicted herein is approximately four feet in diameter within an internal diameter of two and one-half feet. While the overall size of the furnace is not critical, the size of the unit renders itself for continuous operation for the expansion of perlite at a rate of approximately five to six tons per hour.

In accordance with the invention, the apparatus includes a burner on the upper portion of the furnace disposed to direct a flame downwardly along the centerline of the furnace. As here embodied, and most clearly depicted in FIGS. 2 and 3, the upper portion 14 of the furnace 12 includes an opening 24 into which a burner is placed for directing a flame downwardly along the centerline of the furnace. The burner may be of any conventional type but particular success has been had with a Maxon flame retention burner having nozzles of 6 to 8-inch diameters. Natural gas fuel may be used in the burner although LPG may also be used as can propane and butane. In addition, burners utilizing a light grade petroleum oil may also be used in the invention.

In accordance with the invention, the upper portion of the furnace further includes means for introducing particulate solids into the furnace at a plurality of locations. As here embodied and most clearly depicted in FIG. 2, the apparatus includes distribution heads 26 surrounding the burner, each including a conduit portion 28 disposed to direct a stream of the particulate solids both downwardly and toward the centerline of the furnace 12, thereby putting a particulate solid into the flame of the burner. As is evident from FIG. 2 the particulate solids and the flame project unimpeded into the central region of the furnace 12.

Preferably, the distribution heads 26 comprise a metal shell 28 containing thermal insulation 30 surrounding the conduit portion. Particular success has been experienced in using a castable refractory material for this thermal insulation such as conventional castable magnesite. It is also preferred that the conduit portion include an input conduit 32 and a directing conduit 34 in flow communication with the input conduit 32. In order to direct the particulate solid flowing through the directing conduit downwardly and toward the centerline of the furnace the directing conduit 34 is disposed at an angle from 30 to 45 degrees from the vertical. As depicted most clearly in FIG. 2 the directing conduit 34 is disposed at an angle of approximately 45 degrees from the vertical. For a furnace having a two and one-half foot inside diameter the innermost extremity of the directing conduit may be approximately fourteen inches from the centerline of the furnace and obtain the desired result.

Figure 2:
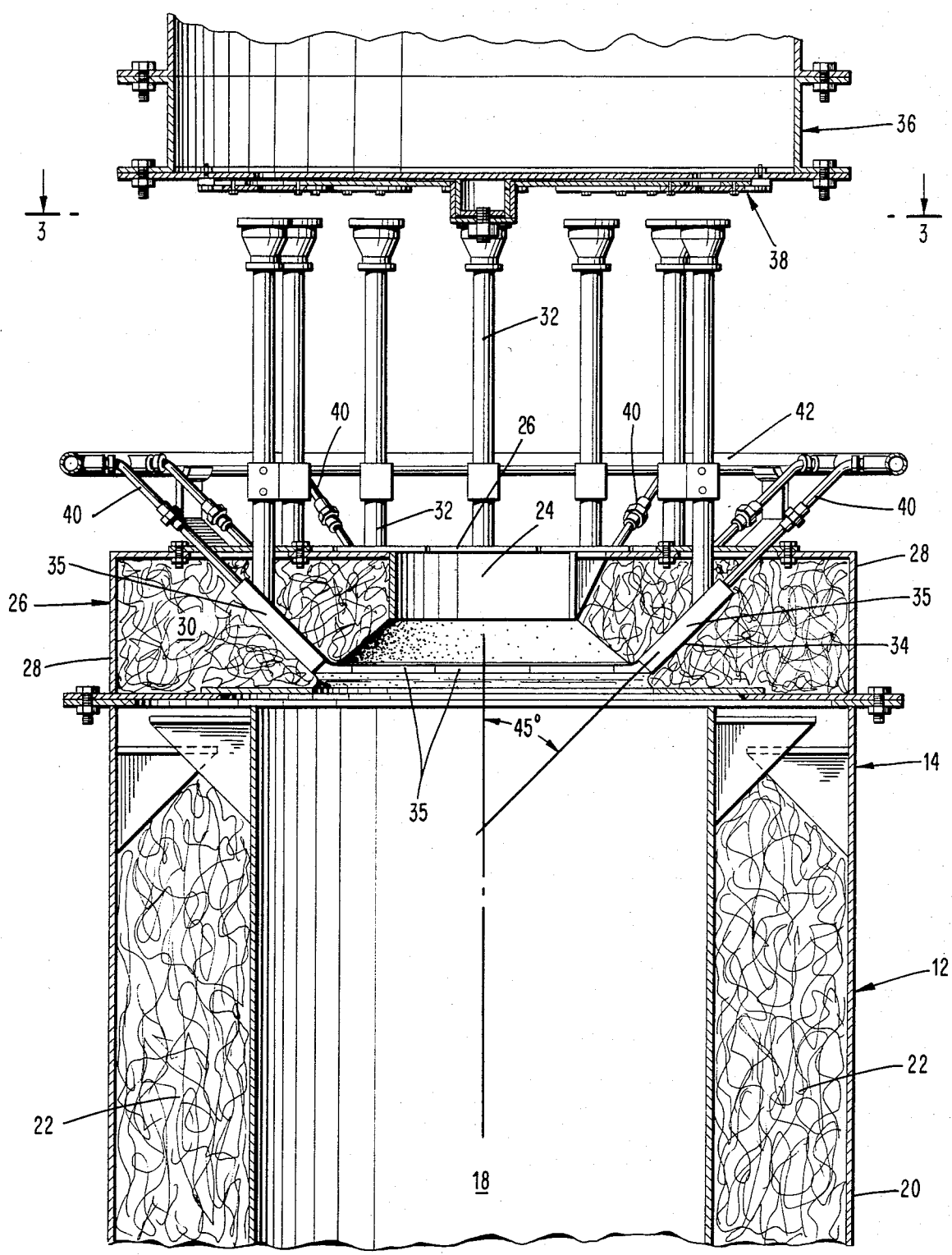
FIG. 2 is a partial cross section of the upper portion of the furnace illustrating the means for introducing the particulate material to the furnace.
Figure 3:
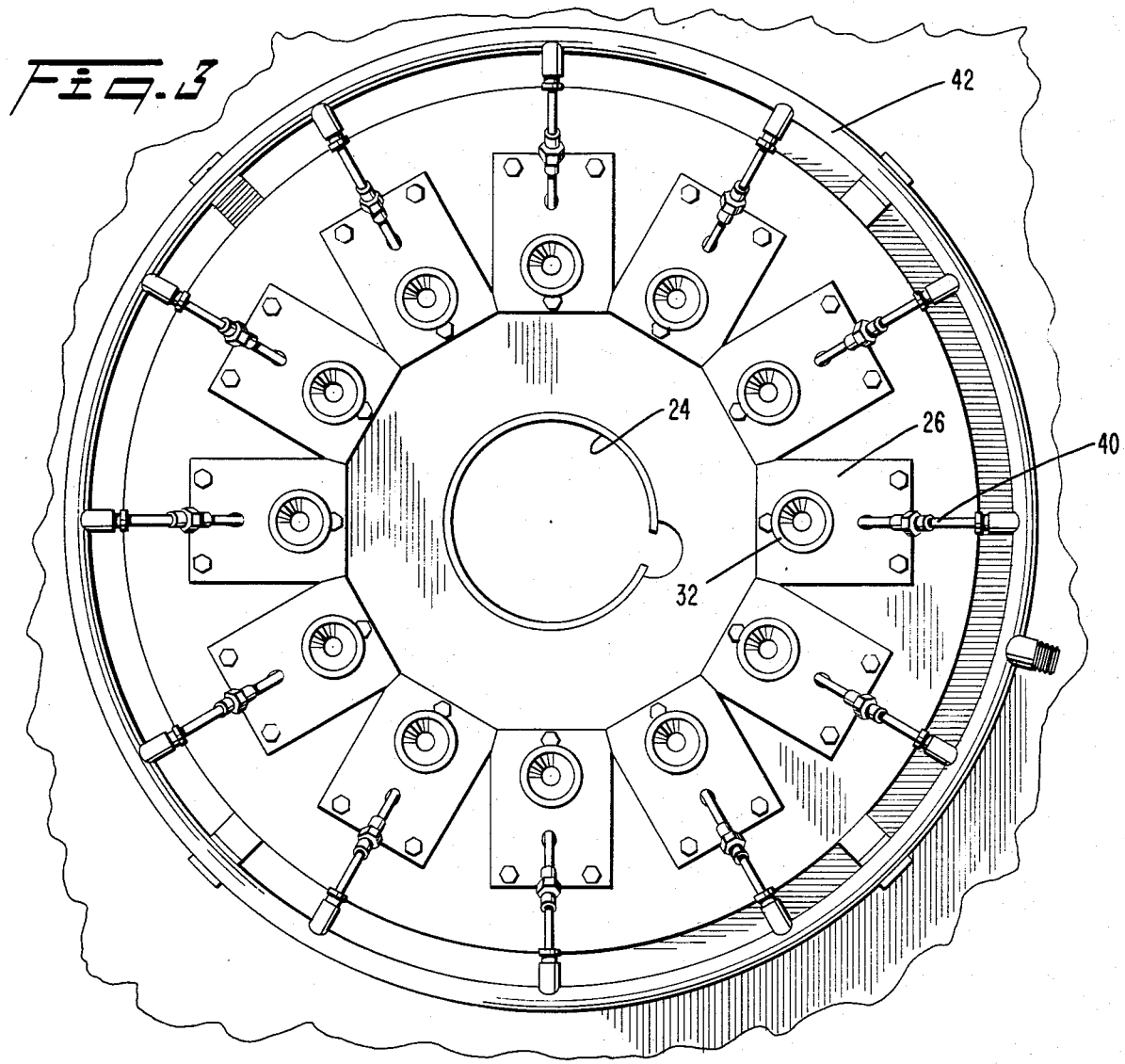
FIG. 3 is a sectional view taken along line 3—3 of FIG. 2 showing the means of introducing the particulate material to the upper end of the furnace.
Figure 4:
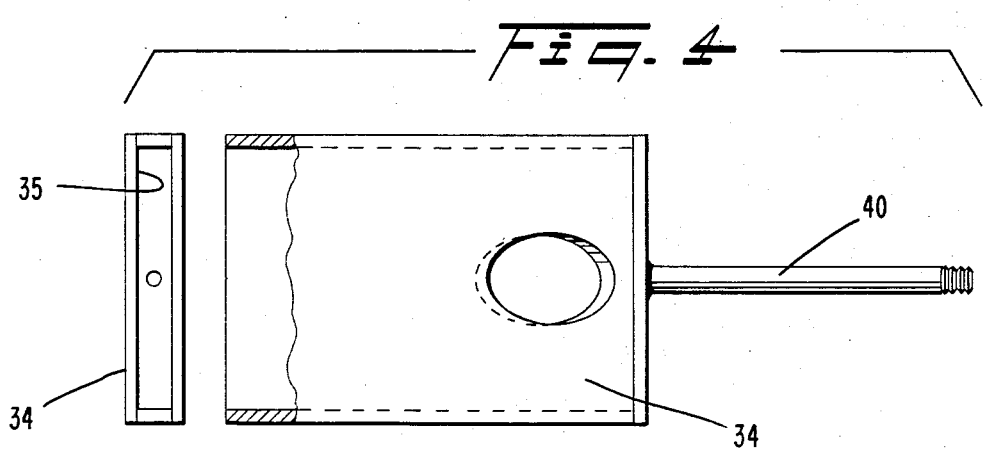
FIG. 4 is a view of one of the conduit portion of the distribution head illustrating the shape of the opening into the interior of the furnace.

The directing conduit 34 is most clearly depicted in FIGS. 2 and 4 as forming a rectangular orifice 35 into the interior of the furnace. Other means of directing the particulate solids into the furnace may be utilized, such as deflectors (not shown), or the shape of the orifice in the directing conduit may be a different configuration than that depicted in FIG. 4.

As shown in the preferred embodiment of FIG. 2 the input conduits 32 are vertically disposed and in flow communication with a source of the particulate material to be introduced to the furnace. As depicted in FIG. 2, the input conduits 32 are in flow communication within a preheater 36. In association with the input conduits are means for adjusting the flow of particulate material into the input conduit to control a total amount of flow into the furnace. As depicted in FIG. 2 the means of the preferred embodiment are an adjustable set of orifices 38 at the bottom of preheater 36 which may be used to control flow of the particulate material into the input conduits 32.

It is also preferred that some means of adjusting the flow of particulate material in the directing conduit 34 be utilized. As here embodied, and most clearly depicted in FIGS. 2 and 3, the apparatus includes means for injecting compressed air into the directing conduit 34. Preferably the air injection conduits 40 are co-linear with the directing conduit 34. The air injection conduits are in flow communication with an air injection header 42 surrounding the upper end of the furnace. While a common supply of air to each of the air injection conduits 40 may be utilized, individual control of air injection at each particular air injection nozzle may also be utilized to further control the flow of particulate material through individual directing conduits.

After the particulate solid material is introduced to the furnace and the flame along its centerline, the material is expanded as will be described in more detail hereinafter. It falls through the influence of both gravity and the burner flame downwardly and is received by a receiving hopper 44 shown in FIG. 1. In a preferred embodiment, air is passed through the hopper 44 and heat is extracted from the material exiting the lower end of the furnace 16. The heated air is passed upwardly in a preheater conduit 46 and utilized in the preheater 36 to heat the material prior to its introduction to the furnace. Downstream from the receiving hopper 44 is another heat exchanger, primary heat recuperater 48. Air is introduced into the primary heat recuperater and the preheated air is directed through the recuperater conduit 50 to be used for combustion in the burner at the upper end of the furnace.

Preferably, the apparatus includes a second heat recuperater 52 that is also utilized to extract heat from the expanded material.

METHOD OF OPERATING THE APPARATUS

While the apparatus of the present invention has been disclosed in terms of an apparatus for heating materials it finds particular utility for heating and expanding minerals such perlite. The present apparatus has been utilized in the expansion of particulate perlite ore and has demonstrated significant improvement over conventional processes both in the rate of which the perlite ore can be expanded and the energy comsumption associated with the expansion process.

In accordance with the invention, the method for expanding perlite ore comprises first directing the flame downwardly along the central axis of a vertically disposed cylindrical furnace. As previously disclosed, the burner used to obtain such a flame may be of conventional construction. A preferred method of operating the disclosed apparatus, and a part of the preferred method of expanding the perlite ore, is to utilize natural gas in combination with preheated air in an air-to-gas ratio in the range from 8:1 to 11:1. Preferably the air-to-gas ratio is the range of 9.5 to 10.5:1 and operation of the device and air-to-gas ratio of 10:1 has proved to be most advantageous. Preferably, the flame will have a temperature in the range of from 2800° to 3400° F. and travel generally from two to twelve feet down the centerline of the expander. The most preferred range of flame length is from four to eight feet and the method has been most efficiently operated with the flame length of approximately six feet. As previously disclosed, the air input to the burner is preferably preheated, and the present method has been successfully operated with the air at a temperature at a range from 600° to 900° F.

In accordance with the invention, an additional step in the method of the present invention is introducing the perlite ore into the furnace at a plurality of locations distributed radially around the flame at the upper end of the furnace. Preferably, the perlite ore is introduced to the furnace at more that four locations on the upper end of the furnace. As disclosed in the embodiment of FIGS. 1-4, the perlite ore is introduced at twelve separate locations although there could be more or fewer locations depending upon the desired rate of feeding in the perlite ore.

In accordance with the invention, the method further includes the step of directing the perlite ore downwardly and toward the central axis of the furnace thereby placing the perlite ore within the flame as it passes downwardly through the furnace. Preferably this step is accomplished by introducing the perlite ore at an angle from the vertical in the range of from about 30 to 45 degrees. The method has been successfully operated where the perlite ore is introduced at an angle of about 45 degrees from the vertical and directed toward the centerline of the furnace. The manner of introducing the perlite ore to the furnace, where it is directed downwardly toward the centerline of the furnace from a plurality of locations surrounding the flame, is believed to result in the perlite effectively mixing with the flame and thereby providing an efficient means of heating the perlite ore to a temperature at which it will expand.

Preferably the perlite ore is introduced to the furnace under the influence of gravity although means may be used to control or influence the flow rate of perlite ore at the locations where it is introduced. As depicted in the apparatus embodiment of the invention compressed air may be introduced to the conduits used to direct the perlite ore into the furnace.

It is preferred that the perlite ore be preheated prior to its introduction to the furnace and further preferred that the perlite ore be preheated with heat recovered from the expanded perlite after the expansion process. In this manner the total energy consumption for the expansion of the perlite is further reduced. Preheating the perlite ore to a temperature in the range of from 200° to 250° F. has proved to be advantageous in the operation of the process. Additional heat from the expanded perlite of the present process is also utilized to preheat the air utilized in the burner. As a result of the combination of the mixing characteristics of the perlite with the flame and the efficient utilization of the heat associated with the expansion process, the present invention is able to expand perlite at an energy consumption of approximately 25 therms per ton of perlite ore and is capable of even lower energy consumption. The expansion of perlite ore with an energy input of less than 40 therms per ton of perlite is a significant advance over the conventional methods of perlite expansion, especially in light of the amounts of perlite ore that can be converted utilizing this method.

The efficient heat transfer between the preheated perlite ore in the flame within the furnace allows the method to be carried out at a rate where it can expand perlite ore in excess of 600 pounds per hour. Furthermore, depending upon the type of perlite ore being treated, the method is capable of expanding perlite at rates in the range of 9000 to 12,000 pounds per hour. In conventional perlite expansion operations, where the perlite is passed upwardly through a furnace by the influence of the air flow and the flame, the expansion process takes from three to four seconds. By contrast the method of the present invention expands the perlite ore in the furnace with a total residence time of less than one second. The residence time is normally in the range of ½ to 7/10ths of a second.

The method of the present invention does not pass large amounts of preheated air through the furnace and preferably only uses small amounts of air to control the flow of perlite ore into the expander. Conventional techniques use large amounts of preheated air to convey the perlite ore up through the expanding apparatus. The expansion process of the present invention is generally operated with a slight negative pressure in the furnace of approximately ½ to 2 inches of water.

As disclosed in the apparatus embodiment, the present invention preferably includes thermal insulation in the sidewalls of the furnace. The combination of the thermal insulation of the furnace, the intimate mixture of the perlite ore with the flame through the unique means of introducing the perlite ore to the flame at the top end of the furnace, and the utilization of the heat of the expansion process to preheat the input materials, results in a process for expanding perlite ore that will expand large amounts of perlite ore at significantly higher rates than conventional processes, at significantly less energy input.

The method of expanding perlite ore has been carried out in apparatus of the configuration depicted in FIGS. 1-4.

EXAMPLE 1

Perlite ore was introduced at a rate of 3.63 tons/hour (7260 pounds/hour) through twelve distribution heads. In thirteen hours and forty-four minutes 51.58 tons of "Antonito" perlite ore was expanded using 119,100 cubic feet of natural gas at an air-to-gas ratio of 10.2:1. The process expended approximately 2.4 million BTU's of heat per ton of perlite ore and produced expanded perlite having a loose weight density of 3.5 to 4.6 pounds/cubic foot.

EXAMPLE 2

The same apparatus as was used in Example 1 was used to expand perlite ore at a rate of 3.56 tons/hour (7114 pounds/hour) to obtain expanded perlite having a loose weight density of 4.6 to 5.9 pounds/cubic foot. The apparatus consumed 108,900 cubic feet of natural gas over fourteen hours and thirty minutes at an air-to-gas ratio of 10.2:1. It expanded 51.58 tons of "Antonito" perlite ore using 2.11 million BTU's per ton of perlite ore.

Having disclosed the present invention by means of both general description and preferred embodiments, the scope of the invention is not to be limited thereto. The scope of the invention is to be determined by the appended claims and their equivalents.

What is claimed is:

1. A method for expanding particulate perlite ore comprising the steps of:
   (a) directly a flame downwardly a distance of from two to twelve feet along the central axis of a vertically disposed cylindrical furnace having an unimpeded central portion;
   (b) introducing the perlite ore into a plurality of conduits disposed at a plurality of locations distributed radially around said flame at the upper end of said furnace;
   (c) injecting compressed air into said conduits in a direction parallel to said conduits; and
   (d) placing said perlite ore directly into said flame by injecting said compressed air and perlite ore downwardly and toward the central axis of said furnace directly into the unimpeded central region of said furnace, whereby said perlite ore and said compressed air are mixed with said flame as said flame passes downwardly through said furnace.

2. The method of claim 1 wherein said flame is in the range of from 4 to 8 feet long.

3. The method of claim 1 wherein said perlite ore is introduced to said furnace at more than four locations on the upper end of said furnace.

4. The method of claim 3 wherein said ore is introduced to said furnace at an angle from the vertical in the range of from 30 to 45 degrees.

5. The method of claim 4 wherein said perlite ore is introduced at twelve locations surrounding said flame.

6. The method of claim 1 wherein said perlite ore takes less than about one second to pass through said furnace.

7. The method of claim 1 wherein said perlite ore is introduced primarily under the influence of gravity.

8. The method of claim 7 wherein compressed air is used to adjust the flow rate of perlite ore at each of the locations where the perlite ore is introduced.

9. The method of claim 1 wherein said method expands said perlite ore at a rate in excess of 6000 lbs/hour.

10. The method of claim 9 wherein said method expands said perlite ore at a rate in the range of from 9000 to 12,000 lbs/hour.

11. The method of claim 1 including the step of preheating said perlite ore with heat recovered from the perlite after it has been expanded.

12. The method of claim 1 wherein said flame has a temperature in the range of from 2800° to 3400° F.

13. The method of claim 1 wherein air for combustion to form said flame is pre-heated with heat recovered from the perlite after it has been expanded.

14. The method of claim 1 wherein said method expands said ore with an energy input of less than 40 therms per ton of perlite ore.

15. A method for expanding particulate perlite ore comprising the steps of:
   (a) directing a flame having a temperature in the range of from 2800° to 3400° F. downwardly 4 to 8 feet along the central axis of a vertically disposed cylindrical furnace having an unimpeded central portion;
   (b) insulating said furnace to reduce heat losses through said furnace;
   (c) introducing perlite ore at a rate in excess of about 6000 lbs/hour into said furnace at a plurality of locations distributed radially around said flame at the upper end of said furnace by injecting compressed air into conduits directing said perlite ore into said furnace, said compressed air being injected in a direction parallel to said conduits; and
   (d) placing said perlite ore directly into said flame by injecting said compressed air and perlite ore downwardly and toward the central axis of said furnace directly into the impeded central region of said furnace, whereby said perlite ore and said compressed air are mixed with said flame as said flame passes downwardly through said furnace such that said perlite ore is expanded after less than about one second exposure to said flame with the energy input for heating said ore being less than 40 therms per ton of perlite ore.

16. An apparatus for heating particulate solids comprising:
   (a) a vertically oriented cylindrical furnace having an upper and lower portion;
   (b) a burner on the upper portion of said furnace disposed to direct a flame from two to twelve feet downwardly along the unimpeded centerline of said furnace; and
   (c) means on the upper portion of said furnace for introducing said particulate solids into said furnace at a plurality of locations distributed radially around said burner, said introducing means including a plurality of distribution heads surrounding said burner, each of said distribution heads including a conduit portion directed downwardly and toward the centerline of said furnace and an air injector disposed to introduce compressed air to said conduit in a direction parallel thereto, said distribution heads directing said particulate solids and said compressed air directly into the central unimpeded region of said furnace.

17. The apparatus of claim 16 wherein said distribution heads comprise a metal shell containing thermal insulation surrounding said conduit portion.

18. The apparatus of claim 17 wherein said conduit portion includes an input conduit and a directing conduit in flow communication with said input conduit, said directing conduit being disposed at an angle of from 30 to 45 degrees from the vertical.

19. The apparatus of claim 18 wherein said conduit portion includes means for injecting compressed air into said directing conduit.

20. The apparatus of claim 18 wherein said input conduit is substantially vertical.

21. The apparatus of claim 16 wherein said furnace is disposed to expand perlite ore, said furnace having an inside diameter of about three feet, said apparatus further including twelve distribution heads each having a conduit portion disposed to direct a stream of perlite ore downwardly and toward the centerline of said furnace, said conduit portion being disposed at an angle of about 45 degrees from the vertical with the inner extremity of said conduit portion being about fourteen inches from the centerline of said furnace.

* * * * *